US012032553B2

United States Patent
Li et al.

(10) Patent No.: US 12,032,553 B2
(45) Date of Patent: Jul. 9, 2024

(54) DATA PROCESSING METHOD AND RELATED APPARATUS

(71) Applicant: TENCENT TECHNOLOGY (SHENZHEN) COMPANY LIMITED, Shenzhen (CN)

(72) Inventors: Haixiang Li, Shenzhen (CN); Wei Lu, Shenzhen (CN); Xiaoyong Du, Shenzhen (CN); Tongtong Wang, Shenzhen (CN); Anqun Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 166 days.

(21) Appl. No.: 17/513,815

(22) Filed: Oct. 28, 2021

(65) Prior Publication Data
US 2022/0050818 A1    Feb. 17, 2022

Related U.S. Application Data

(63) Continuation of application No. PCT/CN2020/113108, filed on Sep. 3, 2020.

(30) Foreign Application Priority Data

Oct. 10, 2019   (CN) .......................... 201910959838.6

(51) Int. Cl.
G06F 16/23    (2019.01)
G06F 16/21    (2019.01)
G06F 16/215   (2019.01)

(52) U.S. Cl.
CPC ........ G06F 16/2343 (2019.01); G06F 16/215 (2019.01); G06F 16/219 (2019.01)

(58) Field of Classification Search
CPC .. G06F 16/2343; G06F 16/215; G06F 16/219; G06F 16/2455; G06F 16/23; G06F 16/21
See application file for complete search history.

(56) References Cited

U.S. PATENT DOCUMENTS 5,887,167 A * 3/1999 Sutton ...................... G06F 9/52
                                                       719/314
2007/0219999 A1   9/2007 Richey et al.
(Continued)

FOREIGN PATENT DOCUMENTS

CN    108153812 A    6/2018
CN    108287835 A    7/2018
(Continued)

OTHER PUBLICATIONS

The European Patent Office (EPO) Extended Search Report for EP Application No. 20874981.2 dated Oct. 19, 2022 15 Pages.
(Continued)

*Primary Examiner* — Maher N Algibhah
(74) *Attorney, Agent, or Firm* — ANOVA LAW GROUP, PLLC

(57) ABSTRACT

A data processing method is provided. The method includes obtaining an operation instruction, the operation instruction including operation type information and target data unit information corresponding to a target data unit; querying a target data group in a data group set according to the target data unit information, the data group set including at least one data group, the data group including at least one data unit; obtaining locked-state information of the target data group; performing locking detection on the target data unit based on the locked-state information and the operation type information to obtain a detection result; performing locking processing on the target data unit based on the detection result; and executing the operation instruction after the
(Continued)

locking processing is performed, to perform an operation corresponding to the operation type information on the target data unit.

18 Claims, 6 Drawing Sheets

(56) References Cited

U.S. PATENT DOCUMENTS

| | | | |
|---|---|---|---|
| 2015/0154272 A1* | 6/2015 | Elias | G06F 16/27 707/610 |
| 2015/0213105 A1 | 7/2015 | Fan | |
| 2015/0277966 A1 | 10/2015 | Sasaki et al. | |
| 2016/0292213 A1* | 10/2016 | Stanfill | G06F 16/22 |
| 2019/0294602 A1 | 9/2019 | Li | |
| 2020/0311736 A1* | 10/2020 | Song | G06Q 20/4016 |

FOREIGN PATENT DOCUMENTS

| | | |
|---|---|---|
| CN | 109634974 A | 4/2019 |
| CN | 110765143 A | 2/2020 |
| JP | 2015191307 A | 11/2015 |
| WO | 2016160416 A1 | 10/2016 |

OTHER PUBLICATIONS

The World Intellectual Property Organization (WIPO) International Search Report for PCT/CN2020/113108 dated Dec. 4, 2020 6 Pages (including translation).

The Japan Patent Office (JPO) Notification of Reasons for Refusal for Application No. 2022-515069 and Translation dated May 15, 2023 4 Pages.

* cited by examiner

DATA PROCESSING METHOD AND RELATED APPARATUS

RELATED APPLICATION(S)

This application is a continuation application of PCT Patent Application No. PCT/CN2020/113108 filed on Sep. 3, 2020, which claims priority to Chinese Patent Application No. 201910959838.6, entitled "DATA PROCESSING METHOD AND APPARATUS, SERVER, AND STORAGE MEDIUM" filed with the Chinese Patent Office on Oct. 10, 2019, all of which are incorporated herein by reference in entirety.

FIELD OF THE TECHNOLOGY

The present disclosure relates to the field of data processing, and more particularly, to a data processing method and apparatus, a server, and a storage medium.

BACKGROUND

Data in a relational database may be stored in the form of tuples, which may be regarded as a table. Each row in the table (that is, each data record in the database) is a tuple, and each column is an attribute.

Transaction processing is a technology for processing the data in the database. When executing a transaction, a computer often may need to access one or more tuples. A concurrent access control technology is to resolve the problem of conflicts that may be caused by simultaneous access to the same tuple when the computer is executing a plurality of transactions at the same time. For example, a tuple may need to be read for a transaction A. However, the tuple may need to be modified for a transaction B at the same time, which may cause a conflict. In order to solve the conflict, a common method is to stagger execution times of the transaction A and the transaction B.

However, such a concurrent access control technology is prone to a conflict misjudgment. As a result, a plurality of concurrent transactions that are misjudged as conflicts may need to be staggered in execution times and cannot be executed at the same time, which leads to low concurrency of executing the transactions. Therefore, such data processing method based on the concurrent access control technology is inefficient.

SUMMARY

Embodiments of the present disclosure provide a data processing method and apparatus, a server, and a storage medium, to improve data processing efficiency.

In one aspect, the present disclosure provides a data processing method, including: obtaining an operation instruction, the operation instruction including operation type information and target data unit information corresponding to a to-be-operated data unit; querying a target data group in a data group set according to the target data unit information, the data group set including at least one data group, the data group including at least one data unit; obtaining locked-state information of the target data group; performing locking detection on the target data unit based on the locked-state information and the operation type information to obtain a detection result; performing locking processing on the target data unit based on the detection result; and executing the operation instruction after the locking processing is performed, to perform an operation corresponding to the operation type information on the target data unit.

In another aspect, the present disclosure provides a data processing apparatus, including: a memory storing computer program instructions; and a processor coupled to the memory and configured to execute the computer program instructions and perform: obtaining an operation instruction, the operation instruction including operation type information and target data unit information corresponding to a target data unit; querying a target data group in a data group set according to the target data unit information, the data group set including at least one data group, the data group including at least one data unit; obtaining locked-state information of the target data group; performing locking detection on the target data unit based on the locked-state information and the operation type information to obtain a detection result; performing locking processing on the target data unit based on the detection result; and executing the operation instruction after the locking processing is performed, to perform an operation corresponding to the operation type information on the target data unit.

In yet another aspect, the present disclosure provides a non-transitory computer-readable storage medium storing computer program instructions executable by at least one processor to perform: obtaining an operation instruction, the operation instruction including operation type information and target data unit information corresponding to a target data unit; querying a target data group in a data group set according to the target data unit information, the data group set including at least one data group, the data group including at least one data unit; obtaining locked-state information of the target data group; performing locking detection on the target data unit based on the locked-state information and the operation type information to obtain a detection result; performing locking processing on the target data unit based on the detection result; and executing the operation instruction after the locking processing is performed, to perform an operation corresponding to the operation type information on the target data unit.

In the present disclosure, corresponding locking processing may be performed on the to-be-operated data unit according to the target data group to which the to-be-operated data unit belongs, so as to execute the operation instruction. Therefore, an amount of calculation during the obtaining of the locked-state information and the locking processing can be reduced in the present disclosure, thereby improving data processing efficiency while ensuring security.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1A:
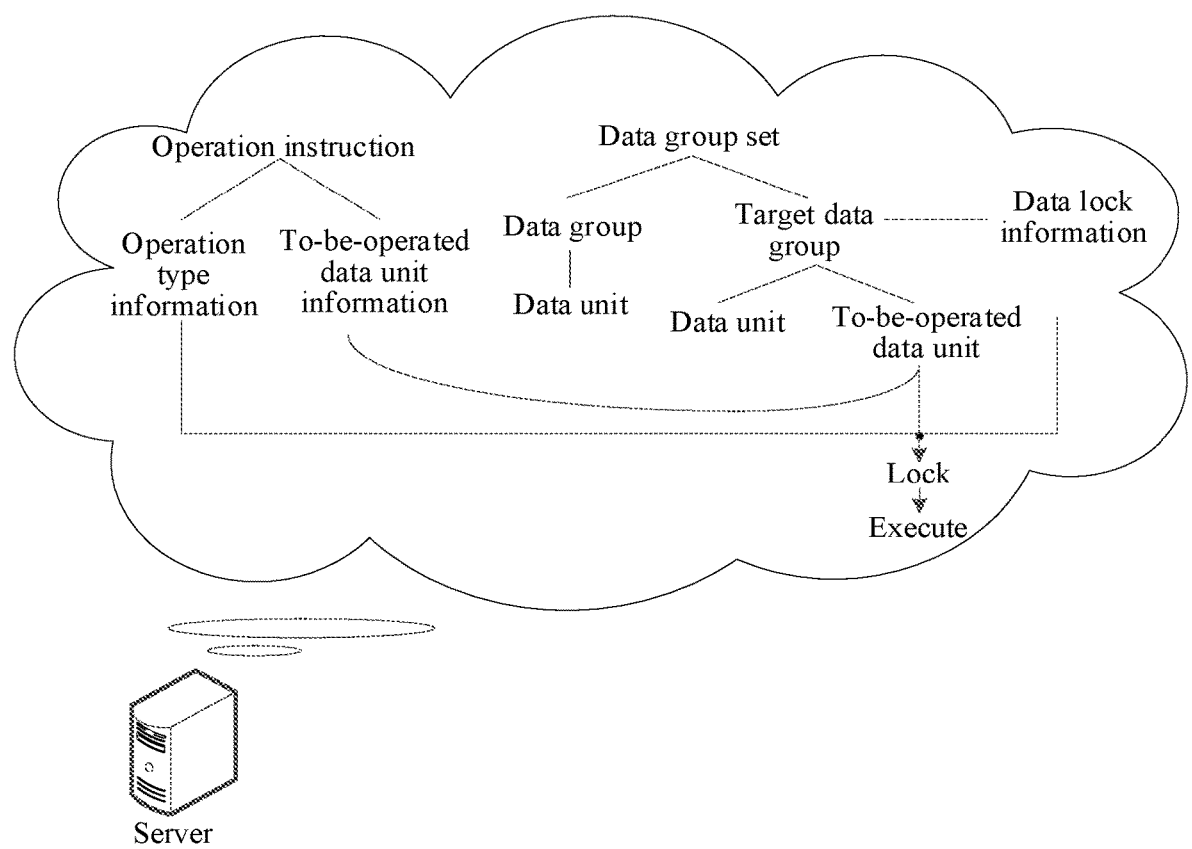
FIG. 1a is a schematic diagram of an implementation scenario of a data processing method according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Table 1 is a user data table as follows:

TABLE 1

|  | User number | User name | User age | User belonging group |
|---|---|---|---|---|
| Tuple A | 0001 | Alan | 18 | Student |
| Tuple B | 0002 | Bryan | 26 | Lawyer |

The table includes a tuple A and a tuple B. Each tuple includes data of four attributes of a user, respectively a user number, a user name, a user age, and a user belonging group.

When executing a transaction, a computer often may need to access one or more tuples. There are many ways to access, including a first-type access, a second-type access, and the like. For example, the first-type access may refer to reading data, and the second-type access may represent writing data.

In another example, the first-type access may refer to writing data, the second-type access may represent reading data, and the like.

In certain situations, and to prevent a conflict, a transaction may need to add data locks to tuples before accessing the tuples, and release the data locks for the tuples after access is performed, so that another transaction cannot access the locked tuples until the tuples are unlocked, thereby avoiding incorrect data processing, which results in low data processing efficiency.

For example, referring to a transaction A and a transaction B in Table 2, the transaction A and the transaction B may perform an operation on the user data table.

TABLE 2

| Moment | Transaction A | Transaction B |
|---|---|---|
| t1 | Lock a tuple A | |
| t2 | Read a user name of the tuple A | |
| t3 | . . . | Detect a data lock on the tuple A |
| t4 | . . . | . . . |
| t5 | . . . | . . . |
| t6 | Lock a tuple B | . . . |
| t7 | Write in a user belonging group of the tuple B | . . . |
| t8 | Submit a transaction | . . . |
| t9 | Unlock | . . . |
| t10 | | Lock a tuple A |
| t11 | | Write in a user belonging group of the tuple A |
| t12 | | Lock a tuple B |
| t13 | | Read a user name of the tuple B |
| t14 | | Submit a transaction |
| t15 | | Unlock |

It can be learned that, the transaction A starts execution first. Before executing reading of the user name of the tuple A, the transaction A may need to lock the tuple A first. After the transaction A locks successfully and performs the reading, the transaction B starts execution. Because the transaction B may need to wait for no data lock on the tuple A and then write in the user belonging group of the tuple A, the transaction B may need to wait until a moment t10 to lock the tuple A.

However, it can be learned that there is no conflict between reading the user name of the tuple A by the transaction A and writing in the user belonging group of the tuple A by the transaction B. However, a current conflict detection mechanism still misjudges this situation as a conflict.

The embodiments of the present disclosure provide a data processing method and a related apparatus, to solve a conflict misjudgment, thereby improving data processing efficiency The data processing apparatus may be integrated into an electronic device. The electronic device may be a device such as a terminal or a server. The terminal may be a device such as a mobile phone, a tablet computer, an intelligent Bluetooth device, a notebook computer, or a personal computer (PC). The server may be a single server or a server cluster that includes a plurality of servers.

In some embodiments, the data processing apparatus may be alternatively integrated into a plurality of electronic devices. For example, the data processing apparatus may be integrated into a plurality of servers, and the data processing method of the present disclosure is implemented by the plurality of servers.

Referring to FIG. 1a, the electronic device may be integrated into a server. The server may obtain an operation instruction, the operation instruction including operation type information and to-be-operated data unit information corresponding to a to-be-operated data unit; query a target data group in a data group set according to the to-be-operated data unit information, the data group set including at least one data group, the data group including at least one data unit; obtain locked-state information of the target data group; perform locking detection on the to-be-operated data unit based on the locked-state information and the operation type information to obtain a detection result; perform locking processing on the to-be-operated data unit based on the detection result; and execute the operation instruction after the locking processing is performed, to perform an operation corresponding to the operation type information on the to-be-operated data unit.

In certain embodiments, the term "to-be-operated data unit" may alternatively be referred to as "target data unit."

Therefore, through the solution, it can be determined, according to the locked-state information of the target data group corresponding to the to-be-operated data unit, whether locking can be performed and the operation instruction can be executed, so as to perform the operation corresponding to the operation type information on the to-be-operated data unit. Through the solution, a conflict can be judged more accurately, thereby solving the problem of low data processing efficiency caused by the conflict misjudgment.

Detailed descriptions are separately provided below. The sequence numbers of the following embodiments are not intended to limit preference orders of the embodiments.

Figure 1B:
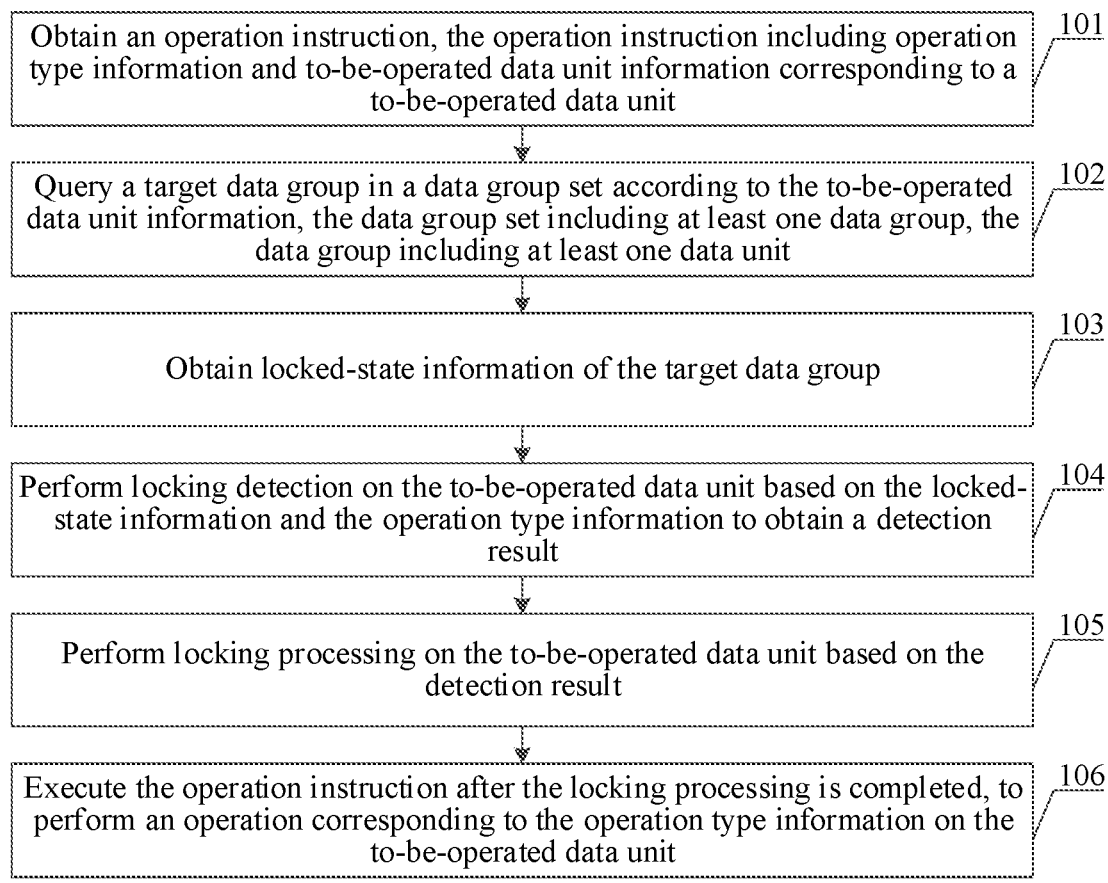
FIG. 1b is a first schematic flowchart of a data processing method according to one or more embodiments of the present disclosure.

In this embodiment, a data processing method is provided. As shown in FIG. 1b, a specific process of the data processing method may be as follows.

101: Obtain an operation instruction, the operation instruction including operation type information and to-be-operated data unit information corresponding to a to-be-operated data unit.

The operation instruction may be an operation instruction for data in a database, and may include the operation type information of the operation instruction, and the to-be-operated data unit information corresponding to the to-be-operated data unit that is to be operated by the operation instruction.

In certain embodiments, the operation instruction may be obtained from a network server by using a network, or may be generated regularly by an electronic device integrated with a data processing apparatus, or may be obtained in a manner in which a technician operates the electronic device and the data processing apparatus obtains an operation instruction generated by the electronic device, and so on.

For example, in some embodiments, the data processing apparatus may obtain an operation instruction transmitted by a technician. In a database update scenario, the technician may import an update file into a database server. During a process of importing the update file, the database server may generate a plurality of operation instructions according to the update file and update operations of the technician.

A specific data operation method may be recorded in the operation type information, for example, reading data, deleting data, updating data, modifying data, writing in data, and so on.

A data unit operated by the operation instruction may be recorded in the to-be-operated data unit information. The data unit is formed by data particles that store data information in the database. Granularity may be used for describing a refinement degree of the data particles stored in the database. A finer granularity of the data particles in the database indicates a higher refinement degree of the database, and a coarser granularity of the data particles in the database indicates a lower refinement degree of the database.

A data particle is a minimum unit that used for storing the data information in the database.

For example, referring to Table 1, there are eight data particles in Table 1, which respectively are 0001 (a user number of the tuple A), Alan (a user name of the tuple A), 18 (a user age of the tuple A), and student (a user belonging group of the tuple A), and 0002 (a user number of the tuple B), Bryan (a user name of the tuple B), 26 (a user age of the tuple B), and lawyer (a user belonging group of the tuple B).

The data unit may be formed by one or more data particles. For example, Table 1 may include two data units, namely, the tuple A and the tuple B. One data unit (that is, the tuple A) has four data particles, which respectively are 0001, Alan, 18, and student, and the other data unit (that is, the tuple B) has four data particles, which respectively are 0002, Bryan, 26, and lawyer.

In another example, Table 1 may include four data units, which respectively are a user number, a user name, a user age, and a user belonging group (lawyer). One data unit (that is, the user number) has two data particles, respectively 0001 and 0002, another data unit (that is, the user name) has two data particles, respectively Alan and Bryan, and still another data unit (that is, the user age) has two data particles, respectively 18 and 26, and the last data unit (that is, the user belonging group) has two data particles, respectively student and lawyer.

Currently, the data unit in the database is a tuple formed by a plurality of data particles. A tuple is a row of data in a structure of a data table stored in the database. For example, referring to Table 1, when the database stores a data table shown in Table 1, the tuple refers to each row in Table 1. That is, Table 1 includes two tuples, respectively the tuple A and the tuple B. The tuple A is formed by four data particles, which may be expressed as tuple A (0001, Alan, 18, student). The tuple B is formed by four data particles, which may be expressed as tuple B (0002, Bryan, 26, lawyer).

In the solution, a manner in which the data unit is formed by data particles may be determined according to initial settings of the database, or may be modified according to settings of the database by a technician. That is, a granularity of the data unit is modified to be smaller than a granularity of the tuple.

A data group set may include one or more data groups, and each of the data groups may include one or more data units. For example, assuming that Table 1 is a data group set. There is only one data group in the data group set. The data group is a tuple A and a tuple B. The data group may have eight data units, respectively a user number of the tuple A, a user name of the tuple A, a user age of the tuple A, a user belonging group of the tuple A, a user number of the tuple B, a user name of the tuple B, a user age of the tuple B, and a user belonging group of the tuple B.

In some embodiments, the data units may be automatically allocated to the data group in advance, so that the data units are reasonably allocated, thereby further reducing a conflict misjudgment probability. After step 101, the method may include the following steps: obtaining a preset value range, and historical operation information of data units; counting quantities of times of historical operations of the data units based on the historical operation information; and grouping the data units based on the quantities of times of historical operations and the preset value range to obtain a data group set.

The preset value range may be set by a person skilled in the art, or may be obtained by using a network, or may be obtained according to a misjudgment probability calculated before, and so on.

The historical operation information of the data unit refers to operation instructions recorded in a historical time. That is, operation type information of the to-be-operated data unit in the historical time is recorded. A quantity of times that each data unit has been operated from the historical moment to a present moment, that is, a quantity of times of historical operations, can be counted based on the historical operation information.

In some embodiments, the data group set may include one first data group and a plurality of second data groups. The step of grouping the data units based on the quantities of times of historical operations and the preset value range to obtain a data group set may include the following steps: respectively calculating historical operation probabilities of the data units based on the quantities of times of historical operations; generating the one first data group; and adding a data unit to the first data group when or in response to determining that a historical operation probability of the data unit does not belong to the preset value range; or generating a second data group corresponding to a data unit when or in response to determining that a historical operation probability of the data unit belongs to the preset value range, and adding the data unit to the second data group corresponding to the data unit.

For example, data units with high historical operation probabilities may be considered as that conflicts are more likely to be caused when a computer processes such data units. Therefore, such data units that are more likely to cause conflicts are divided into one group, and data units that are less likely to cause conflicts are divided into one group, which can effectively reduce a conflict misjudgment rate, and at the same time reduce an amount of calculation, especially when there are too many data units.

In some embodiments, in order to minimize a quantity of data groups to reduce memory consumption, the data unit may include a plurality of data subunits. The steps of generating a second data group corresponding to the data unit, and the adding the data unit to the second data group corresponding to the data unit may include the following specific steps: generating the second data group corresponding to the data unit; and adding the plurality of data subunits to the second data group corresponding to the data unit.

A manner of generating the second data group is: a historical operation probability of each second data group is equal to a sum of historical operation probabilities of all data units in the second data group, while the historical operation probability of the each second data group belongs to the preset value range.

For example, refer to the following formula:

$$P(\text{second data group}) = \sum_{i=1}^{i=n} P(\text{data unit } i \mid \text{second data group})$$

where n is a quantity of data units in the second data group.

Step 102: Query a target data group in a data group set according to the to-be-operated data unit information.

Figure 1C:
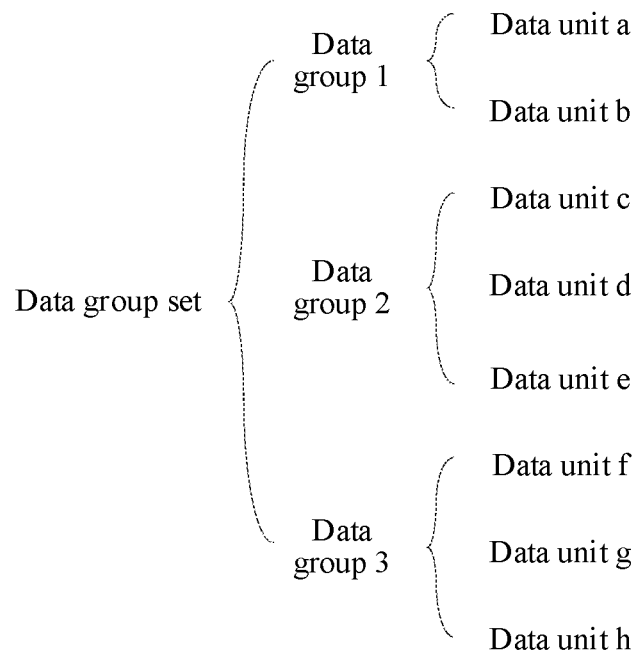
FIG. 1c is a schematic structural diagram of data group in a data processing method according to one or more embodiments of the present disclosure.

Referring to FIG. 1c, the data group set may include a plurality of data groups, and each of the data groups may include a plurality of data units.

The target data group corresponding to the to-be-operated data unit may be queried in the data group set according to the to-be-operated data unit information.

For example, the target data group corresponding to the to-be-operated data unit may be queried, according to the to-be-operated data unit information, in the data group set shown in FIG. 1c. For example, if a data unit c is used as the to-be-operated data unit according to the to-be-operated data unit information, a data group 2 may be determined as the target data group.

In some embodiments, in the solution, the data group set may be automatically updated frequently, so that a conflict can be determined more accurately. Therefore, the method may further include the following steps each time before step 102, to prevent an omission of conflicts: obtaining a grouping update instruction; and regrouping, when or in response to determining that an instruction type of the grouping update instruction is a user grouping type, data units in the data group set by adopting the grouping update instruction; or automatically regrouping data units in the data group set when or in response to determining that an instruction type of the grouping update instruction is an automatic grouping type.

The grouping update instruction may be an instruction used for updating the data group set. The grouping update instruction may be set and transmitted by a user, or may be generated periodically by the grouping update instruction, or may be obtained from a network.

The grouping update instruction may have a plurality of types. For example, the grouping update instruction may be a user grouping type or an automatic grouping type. In some embodiments, the grouping update instruction may alternatively be a mixed grouping type.

A grouping update instruction of the user grouping type refers to that the grouping update instruction is a grouping update instruction issued by a user. A grouping update instruction of the automatic grouping type refers to that the grouping update instruction is a grouping update instruction automatically generated by a computer.

In some embodiments, the step of automatically regrouping data units in the data group set may include the following steps: obtaining a preset value range, and historical operation information of the data units; counting quantities of times of historical operations of the data units in the data group set based on the historical operation information; and grouping the data units based on the quantities of times of historical operations and the preset value range to obtain a data group set after automatic regrouping.

In some embodiments, the grouping update instruction may include a grouping quantity, and the step of regrouping data units in the data group set by adopting the grouping update instruction may include the following steps: equally dividing the data units in the data group set into the grouping quantity of data groups to obtain a data group set after grouping.

The grouping update instruction of the user grouping type may include a grouping quantity set by the user.

For example, if the user sets a grouping quantity to 5, assuming that there are 100 data units in total, the 100 data units are divided into five groups, and each group includes 20 data units.

In some embodiments, to improve the accuracy of conflict detection and reduce the operation difficulty of the user, a grouping update instruction of a mixed grouping type may be further provided. A specific mixed grouping manner is a mixture of the user grouping manner and the computer automatic grouping manner.

For example, a grouping update instruction of the user grouping type may be obtained. The data units are grouped in advance according to the grouping update instruction of the user grouping type, and the data grouped by a user in advance is further automatically grouped in a subsequent data processing scenario.

103: Obtain locked-state information of the target data group.

The locked-state information refers to state information of data locks of all the data units in the data group. The data lock is a virtual concept used for representing a locked state of the data unit or the data group.

The state information of the data lock may indicate a type of the data lock. The data locks may include a plurality of types. For example, data locks may include a read-lock (shared lock) type of data lock and a write-lock (exclusive lock) type of data lock.

The locked-state information may be expressed by identifiers, texts, symbols, or the like. For example, 0 represents no data lock, 1 represents a read-lock type of data lock, and 2 represents a write-lock type of data lock.

Figure 1D:
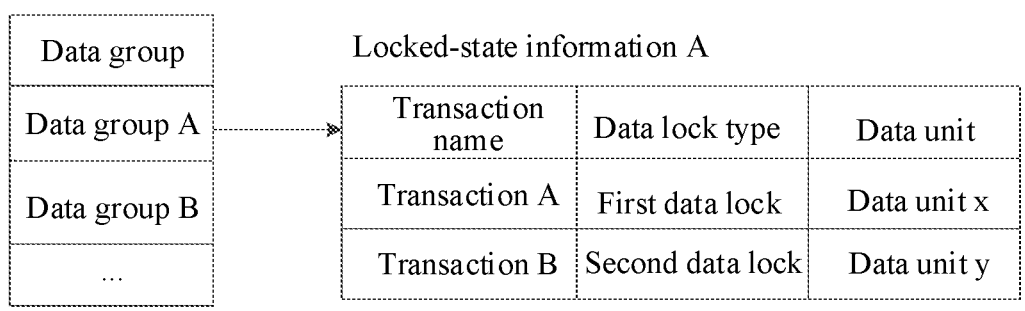
FIG. 1d is a schematic diagram of locked-state information of a data processing method according to one or more embodiments of the present disclosure.

For example, in some embodiments, the data locks may be classified into first data locks and second data locks. Referring to FIG. 1d, a data group A may have a mapping relationship with locked-state information A, and a data group B may have a mapping relationship with locked-state information B.

The locked-state information A has state information of data locks of data units in the data group A, for example, a first data lock added by a transaction A to a data unit x in the data group A, and a second data lock added by a transaction B to a data unit y in the data group A.

104: Perform locking detection on the to-be-operated data unit based on the locked-state information and the operation type information to obtain a detection result.

The operation type information may include a first operation type and a second operation type. The locking detection may include first locking detection and second locking detection. The detection result may include a first locking detection result and a second locking detection result.

Step 104 may include the following steps.

The performing locking detection on the to-be-operated data unit based on the locked-state information and the operation type information to obtain a detection result includes: performing the first locking detection on the to-be-operated data unit based on the locked-state information when or in response to determining that the operation type information is the first operation type, to obtain the first locking detection result; or performing the second locking detection on the to-be-operated data unit based on the locked-state information when or in response to determining that the operation type information is the second operation type, to obtain the second locking detection result.

The data locks may include the first data lock and the second data lock. The step of performing the first locking detection on the to-be-operated data unit based on the locked-state information to obtain the first locking detection result may include the following steps: determining all data locks corresponding to the to-be-operated data unit based on the locked-state information of the target data group; and obtaining the first locking detection result when or in response to determining that all the data locks include neither a first data lock nor a second data lock.

The step of performing the second locking detection on the to-be-operated data unit based on the locked-state information to obtain the second locking detection result may include the following steps: determining all data locks corresponding to the to-be-operated data unit based on the locked-state information of the target data group; and obtaining the second locking detection result when or in response to determining that all the data locks include only a second data lock; or obtaining the second locking detection result when or in response to determining that all the data locks include neither a first data lock nor a second data lock.

105: Perform locking processing on the to-be-operated data unit based on the detection result.

The locking processing may include first locking processing and second locking processing. Step 105 may include the following steps: performing the first locking processing on the to-be-operated data unit based on the first locking detection result; or performing the second locking processing on the to-be-operated data unit based on the second locking detection result.

The step of performing the first locking processing on the to-be-operated data unit based on the first locking detection result may include the following step: adding, for the to-be-operated data unit, a first data lock of the operation instruction to the locked-state information of the target data group based on the first locking detection result.

The step of performing the second locking processing on the to-be-operated data unit based on the second locking detection result may include the following step: adding, for the to-be-operated data unit, a second data lock of the operation instruction to the locked-state information of the target data group based on the second locking detection result.

The data locks may include a plurality of types. For example, the data locks may include a read lock (shared lock) and a write lock (exclusive lock). The write lock may be referred to as a first data lock, and the read lock may be referred to as a second data lock. A relationship between the two types of locks may be as follows:

Read locks of the to-be-operated data unit may coexist, a read lock and a write lock of the to-be-operated data unit are mutually exclusive, and write locks of the to-be-operated data unit are mutually exclusive.

For example, when a data unit Q is to be processed by a transaction A corresponding to an operation instruction A, assuming that the data unit Q already has a read lock of the transaction A, a transaction B may add a read lock of the transaction B to the data unit Q, but cannot add a write lock of the transaction B to the data unit Q. Assuming that the data unit Q already has a write lock of the transaction A, the transaction B can add neither a read lock of the transaction B to the data unit Q nor a write lock of the transaction B to the data unit Q.

In some embodiments, in order to further distinguish between read and write operations to improve the accuracy of conflict detection, the operation type information may include a first operation type and a second operation type, and the lock processing includes first locking processing and second locking processing. Step 104 may include the following steps: performing the first locking processing on the to-be-operated data unit based on the locked-state information when or in response to determining that the operation type information is the first operation type; or performing the second locking processing on the to-be-operated data unit based on the locked-state information when or in response to determining that the operation type information is the second operation type.

For example, the first operation type may be a write type, the second operation type may be a read type, and so on.

For example, the first locking processing may refer to add a write lock to the to-be-operated data unit, and the second locking processing may refer to add a read lock to the to-be-operated data unit, and so on.

The to-be-operated data unit may have transaction locks added by a plurality of transactions. In some embodiments, the locked-state information may include data locks of data units in the target data group, and the data locks may include a first data lock and a second data lock. The step of performing the first locking processing on the to-be-operated data unit based on the locked-state information may include the following steps: determining all data locks corresponding to the to-be-operated data unit based on the locked-state information of the target data group; and adding a first data lock of the operation instruction to the locked-state information of the target data group for the to-be-operated data unit when or in response to determining that all the data locks include neither a first data lock nor a second data lock.

The to-be-operated data unit may have transaction locks added by a plurality of transactions. In some embodiments, the locked-state information may include data locks of data units in the target data group, and the data locks may include a first data lock and a second data lock. The step of performing the second locking processing on the to-be-operated data unit based on the locked-state information may include the following steps: determining all data locks corresponding to the to-be-operated data unit based on the locked-state information of the target data group; and adding a second data lock of the operation instruction to the locked-state information of the target data group for the to-be-operated data unit when or in response to determining that all the data locks include only a second data lock; or adding a second data lock of the operation instruction to the locked-state information of the target data group for the to-be-operated data unit when or in response to determining that the data locks corresponding to the to-be-operated data unit include neither a first data lock nor a second data lock.

106: Execute the operation instruction after the locking processing is performed, to perform an operation corresponding to the operation type information on the to-be-operated data unit.

The operation instruction can only be performed after the locking processing is performed, so as to perform the operation corresponding to the operation type information on the to-be-operated data unit.

When the locking fails, whether there is still a conflict may need to be re-detected, so as to wait for another transaction to unlock, until the conflict disappears. After the locking is performed, the operation instruction is executed to perform the operation corresponding to the operation type information on the to-be-operated data unit.

In some embodiments, after every time an operation instruction is executed to perform the operation corresponding to the operation type information on the to-be-operated data unit, the execution may be saved in the historical operation information, so that the data group set can be updated through automatic grouping, thereby reducing a subsequent amount of calculation of data processing and improving the data processing efficiency. Therefore, after step 105, the method may further include the following steps: obtaining historical operation information of the data unit; and updating the historical operation information of the data unit based on the operation instruction.

In some embodiments, the locked-state information may include data locks of data units in the target data group. After the operation instruction is executed to perform the operation corresponding to the operation type information on the to-be-operated data unit, timely unlocking is performed, which can improve the data processing efficiency of another transaction. Therefore, after step 105, the method may further include the following step: deleting, for the to-be-operated data unit, a data lock corresponding to the operation instruction from the locked-state information of the target data group.

It may be learned from the above that, in this embodiment of the present disclosure, an operation instruction and a data group set may be obtained, the data group set including at least one data group set, the data group set including at least one data unit, the operation instruction including operation type information and to-be-operated data unit information corresponding to a to-be-operated data unit; a target data group corresponding to the to-be-operated data unit is queried in the data group set according to the to-be-operated data unit information; locked-state information of the target data group is obtained; locking processing is performed on the to-be-operated data unit based on the locked-state information and the operation type information; and the operation instruction is executed after the locking processing is performed, to perform an operation corresponding to the operation type information on the to-be-operated data unit. Therefore, in the solution, corresponding locking processing may be performed on the to-be-operated data unit according to the target data group to which the to-be-operated data unit belongs, so as to execute the operation instruction. Therefore, an amount of calculation during the obtaining of the locked-state information and the locking processing can be reduced in the present disclosure, thereby improving data processing efficiency while ensuring security.

According to the method described in the embodiments, the following further provides detailed descriptions.

In this embodiment, the method in this embodiment of the present disclosure is described in detail by using an example in which the data processing apparatus is integrated into a database server.

Figure 2A:
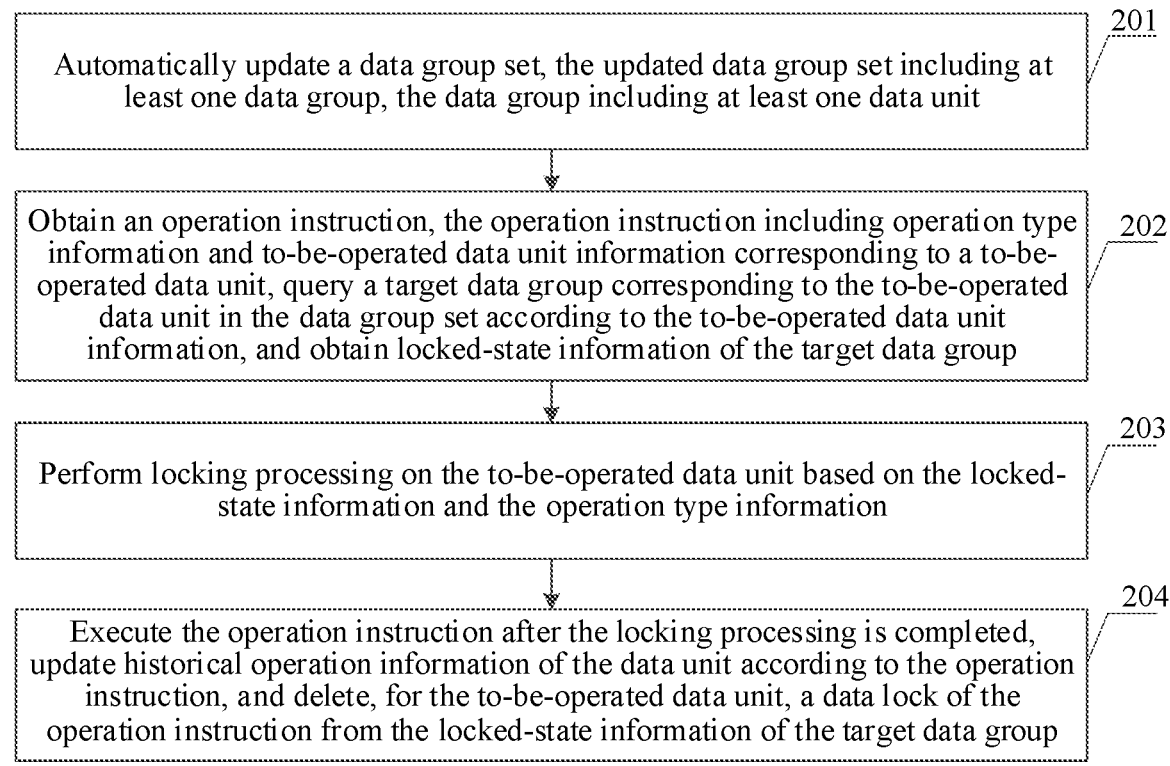
FIG. 2a is a second schematic flowchart of a data processing method according to one or more embodiments of the present disclosure.

As shown in FIG. 2a, a specific process of a data processing method is as follows.

201: Automatically update a data group set, the updated data group set including at least one data group, the data group including at least one data unit.

In this embodiment, before the data group set is automatically updated, a manner in which data units are allocated to data groups in the data group set may be specified by a user.

For example, referring to Table 1, the user may specify that all data units in odd-numbered columns in Table 1 are divided into one data group, and all data units in even-numbered columns are divided into one data group. In another example, all data units in odd-numbered rows in Table 1 (that is, tuples in row 1, row 3, row 5 . . . and the like) are divided into one data group, and all data units in even-numbered rows (that is, tuples in row 2, row 4, row 6 . . . and the like) are divided into one data group.

In another example, referring to Table 1, the user may set a grouping quantity to 4, and specify that all data units in Table 1 are equally divided into four groups.

In another example, referring to Table 1, the user may set a grouping quantity to 2, and specify that data units of every 2 columns in Table 1 are divided into one group.

Specific user grouping may be the same with various manners. Therefore, details are not described herein.

The granularity of conflict detection can be adjusted in the user grouping manner, so that the granularity is reduced from tuples to data groups set by the user, thereby reducing an amount of information maintenance. For example, assuming that a transaction T1 accesses a data unit x and a data unit y in a tuple. If a user divides the data unit x and the data unit y into the same data group, after the transaction T1 is executed (that is, step 207), it only may need to be recorded that the transaction T1 accessed the data group.

In some embodiments, it may be difficult for a user to set an appropriate granularity size of conflict detection (that is, grouping of data groups) in some situations. In order to reduce a conflict misjudgment probability, the data group set may be automatically updated in this embodiment.

A computer may automatically update the data group set by judging data units that are prone to conflicts in the data units. Herein, such data units that are prone to conflicts may be referred to as conflict-prone units, and data units that are not prone to conflicts are referred to as non-conflict-prone units. Next, each conflict-prone unit is individually used as a data group, and the non-conflict-prone units are added to n data groups.

n is a positive integer and may be specified by a user, or may be set by a person skilled in the art, or may be determined according to a quantity of the non-conflict-prone units.

In certain embodiments, a manner of determining a conflict-prone unit and a non-conflict-prone unit is as follows: first obtaining a preset value range, and historical operation information of the data units; counting quantities of times of historical operations of the data units in the data group set based on the historical operation information; and grouping the data units based on the quantities of times of historical operations and the preset value range to obtain a data group set after automatic regrouping.

For example, the preset value range is 10 to positive infinity, the quantities of times of historical operations of the data units in the data group set may be counted according to the historical operation information, a data unit with a quantity of times of historical operations from 10 to positive infinity is determined as a conflict-prone unit; otherwise it is a non-conflict-prone unit.

202: Obtain an operation instruction, the operation instruction including operation type information and to-be-operated data unit information, query a target data group corresponding to a to-be-operated data unit in the data group set according to the to-be-operated data unit information, and obtain locked-state information of the target data group.

The operation type information may be a read type and a write type. Assuming that the to-be-operated data unit is a data unit c, referring to FIG. 1c, the target data group to which the to-be-operated data unit belongs is a data group 2.

Locked-state information of the data group 2 is obtained.

Figure 2B:
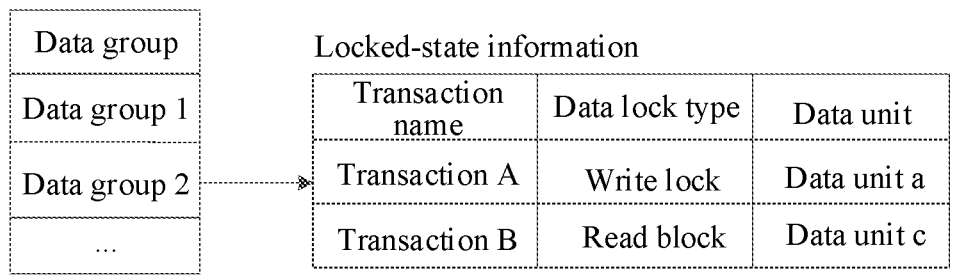
FIG. 2b is a schematic diagram of specific locked-state information of a data processing method according to one or more embodiments of the present disclosure.

For example, referring to FIG. 2b, the locked-state information of the data group 2 may be obtained. A write lock added by a current transaction A to a data unit a and a read lock added by a current transaction B to a data unit c are recorded in the locked-state information of the data group 2.

203: Perform locking processing on the to-be-operated data unit based on the locked-state information and the operation type information.

In this situation, the to-be-operated data unit is the data unit c, and the data unit c currently has a read lock added by the transaction B. Locking processing may be performed on the to-be-operated data unit based on the read lock and the operation type information.

Because read locks can coexist, a read lock and a write lock are mutually exclusive, and write locks are mutually exclusive, when the data unit c currently has a read lock added by the transaction B, if the operation type information indicates a read type, a read lock of a current transaction may be added to the to-be-operated data unit; if the operation type information indicates a write type, locking fails.

For example, when a transaction T wants to add a write lock to a specific data unit of a specific tuple, reference may be made to the following steps: obtaining locked-state information of the tuple; determining that locking succeeds if the locked-state information does not have a data lock; otherwise, determining that locking fails.

For example, when a transaction T wants to add a read lock to a specific data unit of a specific tuple, reference may be made to the following steps: obtaining locked-state information of the tuple; determining that locking succeeds if the locked-state information does not have a data lock; checking, if the locked-state information has a data lock, data locks of the to-be-operated data unit; determining that locking succeeds if no write block exists in the data locks of the to-be-operated data unit; otherwise, determining that locking fails.

204: Execute the operation instruction after the locking processing is performed, to perform an operation corresponding to the operation type information on the to-be-operated data unit, update historical operation information of the data unit according to the operation instruction, and delete, for the to-be-operated data unit, a data lock of the operation instruction from the locked-state information of the target data group.

If the locking fails, the locking processing is performed after the transaction B unlocks the to-be-operated data unit, and the operation instruction is executed to perform the operation corresponding to the operation type information on the to-be-operated data unit. The historical operation information of the data unit is updated according to the operation instruction, and the data lock of the operation instruction is deleted, for the to-be-operated data unit, from the locked-state information of the target data group.

If the locking succeeds, the operation instruction is executed to perform the operation corresponding to the operation type information on the to-be-operated data unit, the historical operation information of the data unit is updated according to the operation instruction, and the data lock of the operation instruction is deleted, for the to-be-operated data unit, from the locked-state information of the target data group.

Figure 2C:
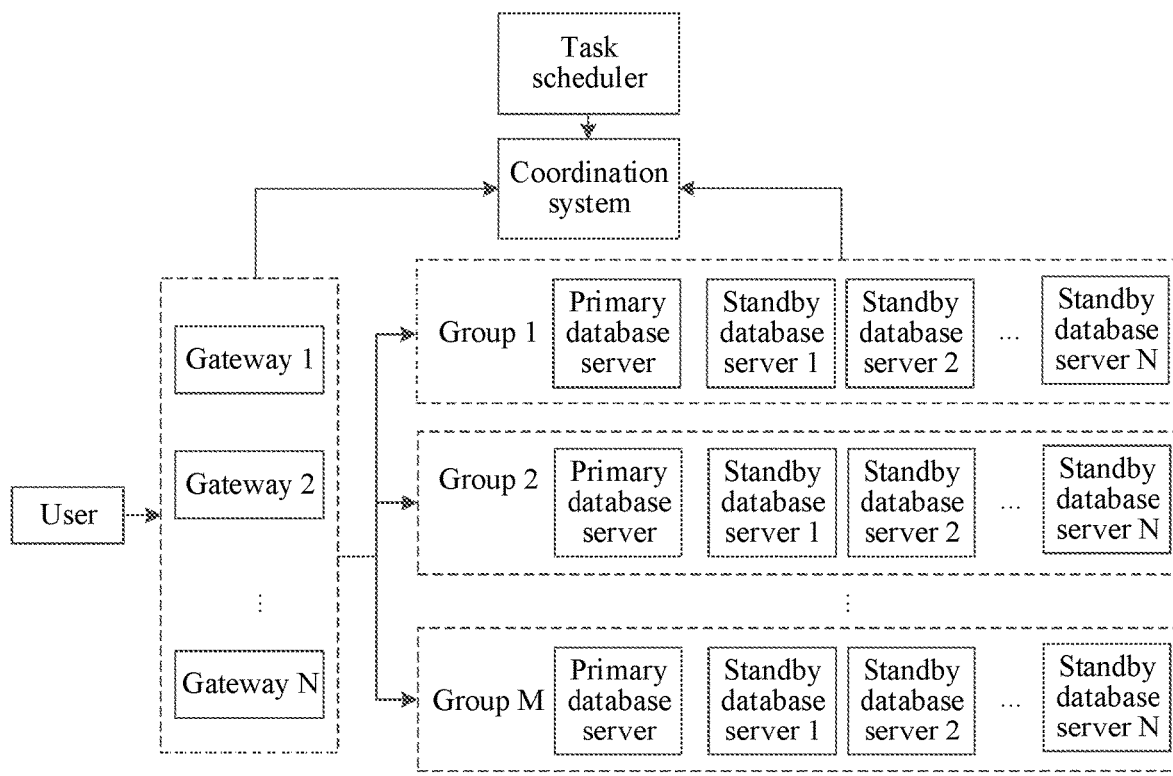
FIG. 2c is a schematic architectural diagram of a distributed data server in a data processing method according to one or more embodiments of the present disclosure.

For example, referring to FIG. 2c, a distributed database architecture in FIG. 2c adopts the data processing solution. The distributed database adopts a manner of a sub-database and a data sub-table for data storage and processing.

A coordination system may be Zookeeper (a distributed computing system), Spark (a distributed computing system), or the like.

The database is divided into M groups. That is, M database groups are obtained. Each group includes a primary database server and N standby database servers, so as to achieve load balancing.

Whenever a user inputs data, an operation instruction transmitted by the user is assigned to a corresponding database group by the coordination system, so that the data written by the user is scattered and stored in different database groups.

For example, a data table inputted by a user is divided a plurality of tables, and the plurality of tables are scattered and stored in different database groups. In another example, according to a logical relationship of data in a data table inputted by a user, a packet is split into a plurality of tables according to some conditions, and the plurality of tables are scattered and stored in different database groups according to a split logic.

Whenever a user inputs a data table, a gateway such as a gateway 1, a gateway 2, . . . , a gateway n may push the data table to the coordination system. The coordination system may store the data table in the form of tasks and transmit the data table to primary database servers or standby database servers in the database, and then collects results returned by the primary or standby database servers in the database groups, and returns the results to the user.

The database may pull a task from the coordination system, switch the primary and standby database servers in each database group, and monitor the state of the database and upload the state to the coordination system.

Therefore, in the distributed database architecture that adopts the data processing solution and is shown in FIG. 2c, the atomicity and consistency of data when the data is read and written can be guaranteed, thereby improving the concurrency of transactions and database throughput while ensuring the conflict detection accuracy, and improving the data processing efficiency.

It may be learned from the above that, in this embodiment of the present disclosure, a data group set may be automatically updated, the updated data group set including at least one data group, the data group including at least one data unit; an operation instruction is obtained, the operation instruction including operation type information and to-be-operated data unit information corresponding to a to-be-operated data unit; a target data group corresponding to the to-be-operated data unit is queried in the data group set according to the to-be-operated data unit information; locked-state information of the target data group is obtained; locking processing is performed on the to-be-operated data unit based on the locked-state information and the operation type information; the operation instruction is executed after the locking processing is performed, to perform an operation corresponding to the operation type information on the to-be-operated data unit; and historical operation information of the data unit is updated according to the operation instruction, and a data lock of the operation instruction is deleted, for the to-be-operated data unit, from the locked-state information of the target data group. Therefore, according to this embodiment of the present disclosure, the concurrency of transactions and database throughput can be improved while ensuring the conflict detection accuracy, thereby improving the data processing efficiency.

In addition, the embodiments of the present disclosure further provide a plurality of grouping methods, so that the granularity of conflict detection can be changed by a user or changed automatically, and an amount of calculation can be further reduced while ensuring the conflict detection accuracy.

To better implement the method, the embodiments of the present disclosure further provide a data processing apparatus. The data processing apparatus may be integrated into an electronic device. The electronic device may be a device such as a terminal or a server. The terminal may be a device such as a mobile phone, a tablet computer, an intelligent Bluetooth device, a notebook computer, or a PC. The server may be a single server or a server cluster that includes a plurality of servers. In some embodiments, the data processing apparatus may be alternatively integrated into a plurality of electronic devices. For example, the data processing apparatus may be integrated into a plurality of servers, and the data processing method of the present disclosure is implemented by a server cluster that includes the plurality of servers.

The embodiments of the present disclosure provide a data processing apparatus. The data processing apparatus may be integrated into an electronic device. The electronic device may be a device such as a terminal or a server. The terminal may be a device such as a mobile phone, a tablet computer, an intelligent Bluetooth device, a notebook computer, or a PC. The server may be a single server or a server cluster that includes a plurality of servers.

In this embodiment, the method in this embodiment of the present disclosure is described in detail by using an example in which the data processing apparatus is integrated into a distributed server cluster.

Figure 3:
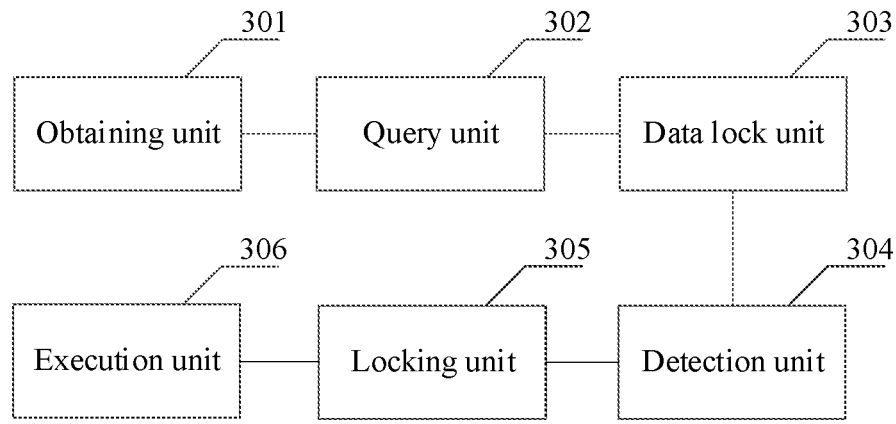
FIG. 3 is a schematic structural diagram of a data processing apparatus according to one or more embodiments of the present disclosure.

For example, as shown in FIG. 3, the data processing apparatus may include an obtaining unit 301, a query unit 302, a data lock unit 303, a detection unit 304, a locking unit 305, and an execution unit 306 as follows:

1. Obtaining unit 301:

The obtaining unit 301 may be configured to obtain an operation instruction, the operation instruction including operation type information and to-be-operated data unit information corresponding to a to-be-operated data unit.

In some embodiments, before performing the step of "obtaining an operation instruction, the operation instruction including operation type information and to-be-operated data unit information", the obtaining unit 301 may further include an obtaining subunit, a counting subunit, and a grouping subunit as follows:

a. Obtaining Subunit:

The obtaining subunit may be configured to obtain a preset value range, and historical operation information of data units;

b. Counting Subunit:

The counting subunit may be configured to count quantities of times of historical operations of the data units based on the historical operation information.

c. Grouping Subunit:

The grouping subunit may be configured to group the data units based on the quantities of times of historical operations and the preset value range to obtain a data group set.

In some embodiments, the data group set may include one first data group and a plurality of second data groups. The grouping subunit may include a probability submodule, a first data group generation submodule, a first data group adding submodule, and a second data group adding submodule as follows.

The probability submodule may be configured to respectively calculate historical operation probabilities of the data units based on the quantities of times of historical operations.

The first data group generation submodule may be configured to generate the one first data group.

The first data group adding submodule may be configured to add a data unit to the first data group when or in response to determining that a historical operation probability of the data unit does not belong to the preset value range.

The second data group adding submodule may be configured to generate a second data group corresponding to a data unit when or in response to determining that a historical operation probability of the data unit belongs to the preset value range, and add the data unit to the second data group corresponding to the data unit.

In some embodiments, the data unit may include a plurality of data subunits, and the first data group adding submodule may be configured to: generate the second data group corresponding to the data unit; and add the plurality of data subunits to the second data group corresponding to the data unit.

2. Query Unit 302:

The query unit 302 may query a target data group in a data group set according to the to-be-operated data unit information, the data group set including at least one data group, the data group including at least one data unit.

In some embodiments, before the query unit 302 is configured to query the target data group corresponding to the to-be-operated data unit in the data group set according to the to-be-operated data unit information, the query unit 302 may include an update subunit, a user update subunit, and an automatically update subunit to: obtain a grouping update instruction; and regroup, when or in response to determining that an instruction type of the grouping update instruction is a user grouping type, data units in the data group set by adopting the grouping update instruction; or automatically regroup data units in the data group set when or in response to determining that an instruction type of the grouping update instruction is an automatic grouping type.

The update subunit is configured to obtain the grouping update instruction.

The user update subunit may be configured to regroup, when or in response to determining that the instruction type of the grouping update instruction is a user grouping type, data units in the data group set by adopting the grouping update instruction.

The automatically update subunit may be configured to automatically regroup data units in the data group set when or in response to determining that the instruction type of the grouping update instruction is an automatic grouping type.

In some embodiments, the automatically update subunit may be configured to: obtain a preset value range, and historical operation information of the data units; count quantities of times of historical operations of the data units in the data group set based on the historical operation information; and group the data units based on the quantities of times of historical operations and the preset value range to obtain a data group set after automatic regrouping.

In some embodiments, the user update subunit may be configured to: equally divide the data units in the data group set into a grouping quantity of data groups to obtain a data group set after grouping.

3. Data Lock Unit 303:

The data lock unit 303 may be configured to obtain locked-state information of the target data group.

4. Detection Unit 304:

The detection unit 304 may be configured to perform locking detection on the to-be-operated data unit based on the locked-state information and the operation type information to obtain a detection result. The operation type information includes a first operation type and a second operation type. The locking detection includes first locking detection and second locking detection. The detection result includes a first locking detection result and a second locking detection result.

In some embodiments, the detection unit 304 may be configured to: perform the first locking detection on the to-be-operated data unit based on the locked-state information when or in response to determining that the operation type information is the first operation type, to obtain the first locking detection result; or perform the second locking detection on the to-be-operated data unit based on the locked-state information when or in response to determining that the operation type information is the second operation type, to obtain the second locking detection result.

5. Locking Unit 305:

The locking unit 305 may be configured to perform locking processing on the to-be-operated data unit based on the detection result.

The locking processing may include first locking processing and second locking processing. The locking unit 305 may be configured to: perform the first locking processing on the to-be-operated data unit based on the first locking detection result; or perform the second locking processing on the to-be-operated data unit based on the second locking detection result.

6. Execution Unit 306:

The execution unit 306 may be configured to execute the operation instruction after the locking processing is performed, to perform an operation corresponding to the operation type information on the to-be-operated data unit.

In some embodiments, after the execution unit 306 performs the operation of executing the operation instruction to perform the operation corresponding to the operation type information on the to-be-operated data unit, the execution unit 306 may be further configured to: obtain historical operation information of the data unit; and update the historical operation information of the data unit based on the operation instruction.

In some embodiments, the locked-state information may include data locks of data units in the target data group. After the execution unit 306 performs the operation of executing the operation instruction to perform the operation corresponding to the operation type information on the to-be-operated data unit, the execution unit 306 may be further configured to: delete, for the to-be-operated data unit, a data lock corresponding to the operation instruction from the locked-state information of the target data group.

During implementations, the data units may be implemented as independent entities, or may be combined, or may be implemented as the same entity or several entities. For specific implementations of the data units, refer to the method embodiments. Details are not described herein again.

It may be learned from the above that, in the data processing apparatus in this embodiment, an obtaining unit obtains an operation instruction, the operation instruction including operation type information and to-be-operated data unit information corresponding to a to-be-operated data unit; a query unit queries a target data group in a data group set according to the to-be-operated data unit information, the data group set including at least one data group, the data group including at least one data unit; a data lock unit obtains locked-state information of the target data group; a detection unit performs locking detection on the to-be-operated data unit based on the locked-state information and the operation type information to obtain a detection result; a locking unit performs locking processing on the to-be-operated data unit based on the detection result; and an execution unit executes the operation instruction after the locking processing is performed, to perform an operation corresponding to the operation type information on the to-be-operated data unit.

Because the embodiments of the solution can reduce an amount of calculation, the embodiments of the solution can improve the data processing efficiency.

The embodiments of the present disclosure further provide an electronic device. The electronic device may be a device such as a terminal or a server. The terminal may be a device such as a mobile phone, a tablet computer, an intelligent Bluetooth device, a notebook computer, or a PC. The server may be a single server or a server cluster that includes a plurality of servers.

Figure 4:
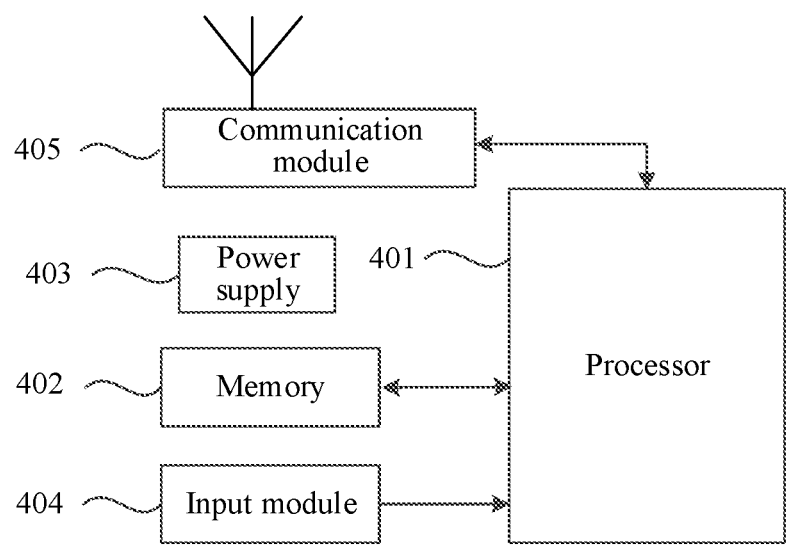
FIG. 4 is a schematic structural diagram of an electronic device according to one or more embodiments of the present disclosure.

In this embodiment, a detailed description is made by using an example in which the electronic device of this embodiment is a server. For example, FIG. 4 is a schematic structural diagram of a server according to an embodiment of the present disclosure.

The server may include components such as a processor 401 including one or more processing cores, a memory 402 including one or more computer-readable storage media, a power supply 403, an input module 404, and a communication module 405. A person skilled in the art may understand that the server structure shown in FIG. 4 does not constitute a limit to the server. The server may include more or fewer parts than those shown in the figure, may combine some parts, or may have different part arrangements. The processor 401 is a control center of the server, and is connected to various parts of the entire server by using various interfaces and lines. By running or executing a software program and/or module stored in the memory 402, and invoking data stored in the memory 402, the processor 401 executes various functions of the server and performs data processing, thereby monitoring the entire server.

In some embodiments, the processor 401 may include the one or more processing cores. In some embodiments, the processor 401 may integrate an application processor and a modem processor. The application processor processes an operating system, a UI, an application program, and the like. The modem processor processes wireless communication. The modem processor may alternatively not be integrated into the processor 401.

The memory 402 may be configured to store a software program and a module, and the processor 401 runs the software program and the module that are stored in the memory 402, to implement various functional applications and data processing. The memory 402 may include a program storage region and a data storage region. The program storage region may store an operating system, an application program required by at least one function (such as a sound playing function and an image display function), and the like. The data storage region may store data created according to use of the server, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The server further includes the power supply 403 for supplying power to the components. In some embodiments, the power supply 403 may be logically connected to the processor 401 by using a power supply management system, thereby implementing functions, such as charging, discharging, and power consumption management, by using the power supply management system. The power supply 403 may further include one or more direct current or alternating current power supplies, a re-charging system, a power failure detection circuit, a power supply converter or inverter, a power supply state indicator, and any other component.

The server may further include an input module 404. The input module 404 may be configured to receive inputted digit or character information, and generate a keyboard, mouse, joystick, optical or track ball signal input related to the user setting and function control.

The server may further include the communication module 405. In some embodiments, the communication module 405 may include a wireless module. The server may perform a short distance wireless transmission through the wireless module of the communication module 405, to provide wireless broadband Internet access for the user. For example, the communication module 405 may be configured to help a user to receive and send an email, browse a web page, access streaming media, and the like.

Although not shown in the figure, the server may further include a display data unit. Details are not further described herein. In this embodiment, the processor 401 in the server loads, into the memory 402 according to the following instructions, executable files corresponding to processes of one or more application programs, and the processor 401 runs the application programs stored in the memory 402 to implement the following various functions: obtaining an operation instruction, the operation instruction including operation type information and to-be-operated data unit information corresponding to a to-be-operated data unit; querying a target data group in a data group set according to the to-be-operated data unit information, the data group set including at least one data group, the data group including at least one data unit; obtaining locked-state information of the target data group; performing locking detection on the to-be-operated data unit based on the locked-state information and the operation type information to obtain a detection result; performing locking processing on the to-be-operated data unit based on the detection result; and executing the operation instruction after the locking processing is performed, to perform an operation corresponding to the operation type information on the to-be-operated data unit.

For specific implementations of the above operations, refer to the embodiments. Details are not described herein again.

It may be learned from the above that, the embodiments of the solution can reduce an amount of calculation, thereby improving the data processing efficiency.

A person of ordinary skill in the art may understand that, all or some steps of the methods in the embodiments may be implemented by using instructions, or implemented through instructions controlling relevant hardware, and the instructions may be stored in a computer-readable storage medium and loaded and executed by a processor.

Accordingly, the embodiments of the present disclosure provide a computer-readable storage medium, storing a plurality of instructions, the instructions being loaded by a processor, to perform the steps in any one of the data processing methods according to the embodiments of the present disclosure. For example, the instructions may perform the following steps: obtaining an operation instruction, the operation instruction including operation type information and to-be-operated data unit information corresponding to a to-be-operated data unit; querying a target data group in a data group set according to the to-be-operated data unit information, the data group set including at least one data group, the data group including at least one data unit; obtaining locked-state information of the target data group; performing locking detection on the to-be-operated data unit based on the locked-state information and the operation type information to obtain a detection result; performing locking processing on the to-be-operated data unit based on the detection result; and executing the operation instruction after the locking processing is performed, to perform an operation corresponding to the operation type information on the to-be-operated data unit.

The storage medium may include a read-only memory (ROM), a random access memory (RAM), a magnetic disk, an optical disc, or the like.

Because the instructions stored in the storage medium may perform the steps in any one of the data processing methods provided in the embodiments of the present disclosure, the instructions can implement beneficial effects that may be implemented by any one of the data processing methods provided in the embodiments of the present disclosure. For details, reference may be made to the embodiments. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments of the present disclosure further provide a computer program product, the computer program product, when executed, being configured to perform the steps in any one of the data processing methods.

A data processing method and apparatus, a server, and a computer-readable storage medium that are provided in the embodiments of the present disclosure are described in detail above. The principle and implementation of the present disclosure are described herein by using specific examples. The descriptions of the embodiments are merely intended to help understand the method and the core idea of the present disclosure. In addition, a person skilled in the art can make variations and modifications in terms of the specific implementations and disclosure scopes according to the ideas of the present disclosure. Therefore, the content of the present disclosure shall not be construed as a limitation to the present disclosure.

What is claimed is:

1. A data processing method, performed by an electronic device, the method comprising:
    obtaining an operation instruction on a target data unit in a database, the operation instruction including operation type information and target data unit information corresponding to the target data unit;
    querying a target data group in a data group set according to the target data unit information, the data group set including at least one data group, the at least one data group being statistically updated and including at least one data unit, and the target data group including at least the target data unit, wherein the at least one data group in the data group set is statistically updated by:
        obtaining a preset value range, and historical operation information of data units in the data group set;
        counting quantities of times of historical operations of the data units based on the historical operation information; and
        grouping the data units based on the quantities of times of historical operations and the preset value range to obtain updated data groups in the data group set;
    obtaining locked-state information of the target data group;
    performing locking detection on the target data unit based on the locked-state information and the operation type information to obtain a detection result on the target data unit;
    performing locking processing on the target data unit based on the detection result on the target data unit; and
    executing the operation instruction after the locking processing is performed, to perform an operation corresponding to the operation type information on the target data unit.

2. The data processing method according to claim 1, wherein the operation type information includes a first operation type and a second operation type, the locking detection includes first locking detection and second locking detection, and the detection result includes a first locking detection result and a second locking detection result;
    wherein performing the locking detection on the target data unit comprises:
        performing the first locking detection on the target data unit based on the locked-state information in response to determining that the operation type information is the first operation type, to obtain the first locking detection result; or
        performing the second locking detection on the target data unit based on the locked-state information in response to determining that the operation type information is the second operation type, to obtain the second locking detection result; and
    wherein the locking processing includes first locking processing and second locking processing, and performing the locking processing on the target data unit comprises:
        performing the first locking processing on the target data unit based on the first locking detection result; or
        performing the second locking processing on the target data unit based on the second locking detection result.

3. The data processing method according to claim 2,
    wherein the locked-state information includes data locks of data units in the target data group, and the data locks include a first data lock and a second data lock;
    wherein performing the first locking detection on the target data unit comprises:
        determining all data locks corresponding to the target data unit based on the locked-state information; and
        obtaining the first locking detection result in response to determining that all the data locks include neither the first data lock nor the second data lock; and
    wherein performing the first locking processing on the target data unit based on the first locking detection result comprises:
        adding, for the target data unit, the first data lock of the operation instruction to the locked-state information based on the first locking detection result.

4. The data processing method according to claim 2,
    wherein the locked-state information includes the data locks of the data units in the target data group, and the data locks include the first data lock and the second data lock;
    wherein performing the second locking detection on the target data unit comprises:
        determining all data locks corresponding to the target data unit based on the locked-state information of the target data group; and
        obtaining the second locking detection result in response to determining that the data locks corresponding to the target data unit include only the second data lock; or obtaining the second locking detection result in response to determining that the data locks corresponding to the target data unit include neither the first data lock nor the second data lock; and
    wherein performing the second locking processing on the target data unit based on the second locking detection result comprises:
        adding, for the target data unit, the second data lock of the operation instruction to the locked-state information based on the second locking detection result.

5. The data processing method according to claim 1,
wherein the data group set includes one first data group and a plurality of second data groups; and
wherein grouping the data units based on the quantities of times of historical operations and the preset value range comprises:
respectively calculating historical operation probabilities of the data units based on the quantities of times of historical operations; and
generating the one first data group, and adding a first data unit to the first data group in response to determining that a historical operation probability of the first data unit does not belong to the preset value range, or generating a second data group corresponding to a second data unit in response to determining that a historical operation probability of the second data unit belongs to the preset value range, and adding the second data unit to the second data group corresponding to the second data unit.

6. The data processing method according to claim 5,
wherein the second data unit includes a plurality of data subunits; and
wherein generating the second data group and adding the second data unit to the second data group comprise:
generating the second data group corresponding to the second data unit; and
adding the plurality of data subunits to the second data group corresponding to the second data unit.

7. The data processing method according to claim 1, further comprising:
obtaining a grouping update instruction; and
regrouping, in response to determining that an instruction type of the grouping update instruction is a user grouping type, the data units in the data group set by adopting the grouping update instruction; or automatically regrouping the data units in the data group set in response to determining that the instruction type of the grouping update instruction is an automatic grouping type.

8. The data processing method according to claim 7,
wherein automatically regrouping the data units in the data group set comprises:
obtaining the preset value range, and the historical operation information of the data units in the data group set;
counting the quantities of times of historical operations of the data units in the data group set based on the historical operation information; and
grouping the data units based on the quantities of times of historical operations and the preset value range to obtain the updated data groups in the data group set after automatic regrouping.

9. The data processing method according to claim 7,
wherein the grouping update instruction includes a grouping quantity; and
wherein regrouping the data units in the data group set comprises:
equally dividing the data units in the data group set into the grouping quantity of data groups to obtain the updated data groups in the data group set after grouping.

10. The data processing method according to claim 1, further comprising after executing the operation instruction on the target data unit:
obtaining the historical operation information of the target data unit; and
updating the historical operation information of the target data unit based on the operation instruction.

11. The data processing method according to claim 1,
wherein the locked-state information includes data locks of the data units in the target data group, and wherein after executing the operation instruction on the target data unit, the method further comprises:
deleting, for the target data unit, the data lock corresponding to the operation instruction from the locked-state information.

12. A data processing apparatus, comprising:
a memory storing computer program instructions; and
a processor coupled to the memory and configured to execute the computer program instructions and perform:
obtaining an operation instruction on a target data unit in a database, the operation instruction including operation type information and target data unit information corresponding to the target data unit;
querying a target data group in a data group set according to the target data unit information, the data group set including at least one data group, the at least one data group being statistically updated and including at least one data unit, and the target data group including at least the target data unit, wherein the at least one data group in the data group set is statistically updated by:
obtaining a preset value range, and historical operation information of data units in the data group set;
counting quantities of times of historical operations of the data units based on the historical operation information; and
grouping the data units based on the quantities of times of historical operations and the preset value range to obtain updated data groups in the data group set;
obtaining locked-state information of the target data group;
performing locking detection on the target data unit based on the locked-state information and the operation type information to obtain a detection result on the target data unit;
performing locking processing on the target data unit based on the detection result on the target data unit; and
executing the operation instruction after the locking processing is performed, to perform an operation corresponding to the operation type information on the target data unit.

13. The data processing apparatus according to claim 12,
wherein the operation type information includes a first operation type and a second operation type, the locking detection includes first locking detection and second locking detection, and the detection result includes a first locking detection result and a second locking detection result;
wherein performing the locking detection on the target data unit comprises:
performing the first locking detection on the target data unit based on the locked-state information in response to determining that the operation type information is the first operation type, to obtain the first locking detection result; or
performing the second locking detection on the target data unit based on the locked-state information in response to determining that the operation type information is the second operation type, to obtain the second locking detection result; and
wherein the locking processing includes first locking processing and second locking processing, and performing the locking processing on the target data unit comprises:

performing the first locking processing on the target data unit based on the first locking detection result; or performing the second locking processing on the target data unit based on the second locking detection result.

14. The data processing apparatus according to claim 13, wherein the locked-state information includes data locks of all the data units in the target data group, and the data locks include a first data lock and a second data lock;

wherein performing the first locking detection on the target data unit comprises:
determining all data locks corresponding to the target data unit based on the locked-state information; and
obtaining the first locking detection result in response to determining that all the data locks include neither the first data lock nor the second data lock; and wherein performing the first locking processing on the target data unit based on the first locking detection result comprises:
adding, for the target data unit, the first data lock of the operation instruction to the locked-state information based on the first locking detection result.

15. The data processing apparatus according to claim 13, wherein the locked-state information includes data locks of the data units in the target data group, and the data locks include the first data lock and the second data lock;

wherein performing the second locking detection on the target data unit comprises:
determining all the data locks corresponding to the target data unit based on the locked-state information of the target data group; and
obtaining the second locking detection result in response to determining that the data locks corresponding to the target data unit include only the second data lock; or obtaining the second locking detection result in response to determining that the data locks corresponding to the target data unit include neither the first data lock nor the second data lock; and wherein performing the second locking processing on the target data unit based on the second locking detection result comprises:
adding, for the target data unit, the second data lock of the operation instruction to the locked-state information based on the second locking detection result.

16. The data processing apparatus according to claim 12, wherein the data group set includes one first data group and a plurality of second data groups; and wherein grouping the data units based on the quantities of times of historical operations and the preset value range comprises:
respectively calculating historical operation probabilities of the data units based on the quantities of times of historical operations; and
generating the one first data group, and adding a first data unit to the first data group in response to determining that a historical operation probability of the first data unit does not belong to the preset value range, or generating a second data group corresponding to a second data unit in response to determining that a historical operation probability of the second data unit belongs to the preset value range, and adding the second data unit to the second data group corresponding to the second data unit.

17. The data processing apparatus according to claim 16, wherein the second data unit includes a plurality of data subunits; and wherein generating the second data group and adding the second data unit to the second data group comprise:
generating the second data group corresponding to the second data unit; and
adding the plurality of data subunits to the second data group corresponding to the second data unit.

18. A non-transitory computer-readable storage medium storing computer program instructions executable by at least one processor to perform:
obtaining an operation instruction on a target data unit in a database, the operation instruction including operation type information and target data unit information corresponding to the target data unit;
querying a target data group in a data group set according to the target data unit information, the data group set including at least one data group, the at least one data group being statistically updated and including at least one data unit, and the target data group including at least the target data unit, wherein the at least one data group in the data group set is statistically updated by:
obtaining a preset value range, and historical operation information of data units in the data group set;
counting quantities of times of historical operations of the data units based on the historical operation information; and
grouping the data units based on the quantities of times of historical operations and the preset value range to obtain updated data groups in the data group set;
obtaining locked-state information of the target data group;
performing locking detection on the target data unit based on the locked-state information and the operation type information to obtain a detection result on the target data unit;
performing locking processing on the target data unit based on the detection result on the target data unit; and
executing the operation instruction after the locking processing is performed, to perform an operation corresponding to the operation type information on the target data unit.

* * * * *